(12) United States Patent
Moerk et al.

(10) Patent No.: US 11,548,075 B2
(45) Date of Patent: Jan. 10, 2023

(54) TOOL HOLDER ASSEMBLY AND METHOD OF MANUFACTURING A TOOL HOLDER

(71) Applicant: MAS GmbH, Leonberg (DE)

(72) Inventors: Thomas Moerk, Renningen (DE); Uwe Boelke, Kirchberg/Murr (DE)

(73) Assignee: MAS GmbH, Leonberg (DE)

( * ) Notice: Subject to any disclaimer, the term of this patent is extended or adjusted under 35 U.S.C. 154(b) by 422 days.

(21) Appl. No.: 16/639,054

(22) PCT Filed: Aug. 13, 2018

(86) PCT No.: PCT/EP2018/071945
§ 371 (c)(1),
(2) Date: Feb. 13, 2020

(87) PCT Pub. No.: WO2019/034620
PCT Pub. Date: Feb. 21, 2019

(65) Prior Publication Data
US 2020/0198020 A1    Jun. 25, 2020

(30) Foreign Application Priority Data
Aug. 14, 2017   (DE) ..................... 10 2017 118 501.1

(51) Int. Cl.
*B23B 29/04*    (2006.01)
*B23B 31/107*   (2006.01)
(Continued)

(52) U.S. Cl.
CPC ............ *B23B 29/046* (2013.01); *B23B 27/10* (2013.01); *B23B 31/1076* (2013.01);
(Continued)

(58) Field of Classification Search
CPC ..... B23B 27/10; B23B 29/046; B23B 31/107; B23B 31/1073; B23B 31/10741;
(Continued)

(56) References Cited

U.S. PATENT DOCUMENTS 4,511,294 A * 4/1985 Grunsky ............. B23B 31/1076
408/232
4,647,052 A   3/1987 Bütikofer
(Continued)

FOREIGN PATENT DOCUMENTS

DE    102004001148 B3 *  6/2005  ........... B23B 29/046
EP        3120958 A1 *   1/2017  ........... B23B 31/005
(Continued)

OTHER PUBLICATIONS

Machine Translation, JPS57178605A, Description. (Year: 1982).*
(Continued)

*Primary Examiner* — Chwen-Wei Su
(74) *Attorney, Agent, or Firm* — Haynes and Boone, LLP

(57) ABSTRACT

Tool holder for a tool for machining workpieces, with a tool holder body, which defines a longitudinal axis, on which a tool mount for securing a tool is formed and on which a tool holder interface for fixating the tool holder to a holder shaft is formed, wherein the tool holder interface comprises: a tool holder plane surface oriented transversely to the longitudinal axis, against which a holder shaft plane surface can abut to establish a defined relative position in longitudinal direction between the tool mount and the holder shaft, a tool holder cone section, which is polygonal in a cross-section and which can engage with a correspondingly polygonal holder shaft cone section to establish a defined relative position in tangential direction between the tool mount and the holder shaft, and a tool holder cylinder section which can act together with a corresponding holder shaft cylinder section.

16 Claims, 4 Drawing Sheets

(51) Int. Cl.
    *B23B 27/10*     (2006.01)
    *B23P 15/28*     (2006.01)
    *B23Q 11/10*     (2006.01)

(52) U.S. Cl.
    CPC ....... *B23B 2231/24* (2013.01); *B23B 2250/12* (2013.01); *B23B 2265/32* (2013.01); *B23P 15/28* (2013.01); *B23Q 11/1023* (2013.01)

(58) Field of Classification Search
    CPC ............ B23B 31/1075; B23B 31/1076; B23B 2231/022; B23B 2231/0224; B23B 2231/0228; B23B 2231/46; B23B 2231/0204; B23B 2231/24; B23B 2250/12; B23B 2265/32; B23P 15/28; B23Q 11/1023
    See application file for complete search history.

(56) References Cited

U.S. PATENT DOCUMENTS

| | | | |
|---|---|---|---|
| 4,655,655 | A | 4/1987 | Schürfeld |
| 4,725,173 | A | 2/1988 | Hoffman et al. |
| 4,834,597 | A | 5/1989 | Andersson et al. |
| 5,873,682 | A * | 2/1999 | Tripsa ................. B23B 31/1075 407/89 |
| 6,599,050 | B1 | 7/2003 | Sjöö |
| 7,549,358 | B2 | 6/2009 | Pantzar |
| 8,967,928 | B2 | 3/2015 | Kress |
| 11,161,179 | B2 * | 11/2021 | Stojanovski .......... B23B 31/005 |
| 2006/0056933 | A1 | 3/2006 | Guy |
| 2008/0166198 | A1 * | 7/2008 | Stojanovski .......... B23B 31/006 409/234 |
| 2011/0169230 | A1 * | 7/2011 | Babel ................... B23B 31/208 279/46.9 |
| 2014/0305268 | A1 | 10/2014 | Olsson et al. |

FOREIGN PATENT DOCUMENTS

| | | | | |
|---|---|---|---|---|
| JP | 57178605 A | * | 12/1982 | |
| JP | S6 215 055 | | 10/2011 | |
| KR | 20090095296 A | * | 9/2009 | |
| WO | WO-2011030936 A1 | * | 3/2011 | ........... B23B 27/007 |
| WO | WO 2014/157943 | | 10/2014 | |

OTHER PUBLICATIONS

Sandvik Coromant: "Rotating Tools 2011", Dec. 31, 2010, 4 pages, Sandviken, Sweden.
Sandvik Coromant: "Turning Tools 2011", Dec. 31, 2010, 4 pages, Sandviken, Sweden.
Sandvik Coromant: "Rotating Tools 2001", Feb. 28, 2001, 1 page, Sandviken, Sweden.
"Advertisement" Werkstatt + Betrieb, Carl Hanser Verlag, vol. 124 No. 1, Jan. 1, 1991, 1 page, Munchen/Germany (English translation included).

* cited by examiner

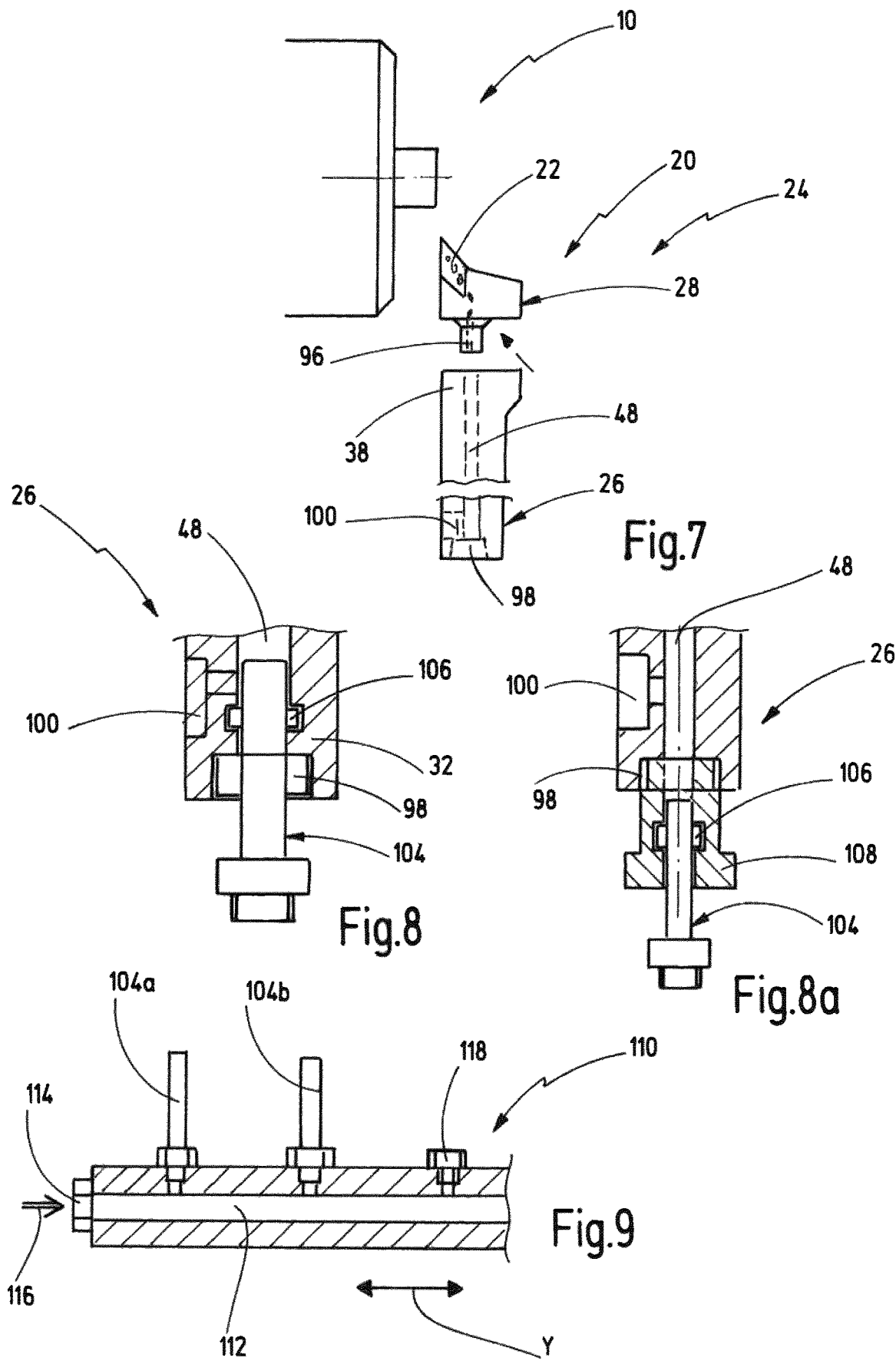

TOOL HOLDER ASSEMBLY AND METHOD OF MANUFACTURING A TOOL HOLDER

CROSS-REFERENCE TO RELATED APPLICATIONS

This patent application is a U.S. National Stage Patent Application under 35 U.S.C. 371 of International Patent Application No. PCT/EP2018/071945 filed Aug. 13, 2018, which claims priority to and the benefit of German Patent Application No. 10 2017 118 501.1 filed Aug. 14, 2017, all of which are hereby incorporated by reference in their entirety.

TECHNICAL FIELD

The invention at hand relates to a tool holder for a tool for machining workpieces, with a tool holder body, which defines a tool holder longitudinal axis, on which tool holder body a tool mount for securing a tool is formed and on which a tool holder interface for fixating the tool holder to a holder shaft is formed.

Furthermore, the invention at hand relates to an associated holder shaft as well as a tool assembly with a tool holder assembly comprising a tool holder with a tool secured thereto and a holder shaft.

Finally, the invention at hand relates to a method for manufacturing a tool holder.

BACKGROUND

In the field of machining of workpieces, in particular of metallic workpieces, it is known to secure tools such as indexable plates to a tool holder assembly, in particular to secure them detachably in order to be able to replace a worn tool in a simple manner.

Such tool holder assemblies usually include a holder shaft which can be clamped in a clamping device of a machine tool such that forces and torques can be transmitted from the machine tool to the tool.

So-called "monoblock" designs are known here, in which a holder shaft comprises a tool holder head integrally formed thereon at one end, on which a tool mount for fixating a tool is formed.

If a different tool is to be used in the machine tool with this type of tool holder assembly, the tool holder assembly is to be removed from the clamping device of the machine tool as a whole in order to then clamp another tool holder assembly in the machine tool.

In the field of tool holder assemblies, quick-change tool holders have also become well-known. The basic idea here is to clamp one component of such a quick-change tool concept permanently in a tool machine and to provide an interface on such a holder shaft for connection with tool holders on which different tools can be formed or secured.

A system that has long been known in the machine tool industry has become known as "Coromant Capto®".

Since a holder shaft in the form of a coupling is firmly clamped in the machine tool, tool changes can be performed very quickly. Furthermore, in many cases it is not necessary to recalibrate a newly inserted tool with regard to its position relative to the machine tool. Tool changes can therefore be performed very quickly.

A tool coupling is also known from document EP 1 154 872 B1, with a holder, an adapter for at least one cutting insert for swarf removing machining and a screw to detachably connect the holder and the adapter to each other. The longitudinal center axis of the screw coincides with the longitudinal center axis of the tool coupling. The holder is provided with a first toothing with mutually parallel grooves. The adapter is provided with a second toothing with mutually parallel grooves. Both the first toothing and the second toothing are located in a plane that has an extension that is essentially perpendicular to the longitudinal center axis of the tool coupling. The screw has a first external threading which, in the active position, is in engagement with an internal threading of the holder. Furthermore, the screw has an outwardly extending, inner, centrally located cooling passage.

Further, document EP 1 547 710 B1 discloses a cutting tool comprising two parts which can be connected to each other by means of toothed connecting surfaces separately comprising a group of, in cross-section, substantially V-shaped ribs which are arranged in a spaced fashion via grooves formed by slanted flanks on the ribs, wherein the ribs are elongated and parallel to each other. At least one of the two flanks, which together define a groove, is formed with two or more contact support surfaces arranged in a spaced fashion, which are arranged in a common plane, which geometrically defines the flank, as well as one or more recessed free surfaces between them.

The quick-change system mentioned above is based on an axial clamping by means of a screw, which is oriented coaxially with a longitudinal axis of the tool holder. In order to enable an actuation of the screw from a side, an elaborate construction inside the holder shaft is necessary, so that the holder shaft is very large overall. The quick-change tool holder described above is therefore particularly suitable for large workpieces.

In general, changing systems are also known, in which tool carriers are attached to a holder by means of screws that enter the holder at an angle. Here too, however, accessibility is relatively poor, in particular if several such holder shafts are mounted parallel to each other offset, for example in y-direction. If plane surfaces are used in such changing systems, it is also common practice to grind them, in particular to ensure sufficient leakproofness if coolant is to be transported from the holder shaft to the tool holder.

SUMMARY

In light of this background, it is an object of the invention to provide an improved tool holder system as well as an improved method for manufacturing a tool holder.

The above object is for one solved by a tool holder for a tool for machining workpieces, with a tool holder body, which defines a tool holder longitudinal axis, on which tool holder body a tool mount for securing a tool is formed and on which a tool holder interface for fixating the tool holder to a holder shaft is formed, which can be clamped in a tool machine, wherein the tool holder interface comprises: a tool holder plane surface oriented transversely to the longitudinal axis, against which tool holder plane surface a holder shaft plane surface can come into abutment in order to be able to establish a defined relative position ($L_{WR}$) in longitudinal direction between the tool mount and the holder shaft, a tool holder cone section, which is polygonal in a cross-section and which can come into engagement with a correspondingly polygonal holder shaft cone section in order to be able to establish a defined relative position in tangential direction between the tool mount and the holder shaft, and a tool holder cylinder section which can act together with a corresponding holder shaft cylinder section.

Furthermore, the above object is solved by a holder shaft for a tool holder, in particular a tool holder according to the invention, with a holder shaft body which comprises a shaft section for clamping in a clamping device of a machine tool and a holder shaft interface for fastening a tool holder to the holder shaft body, the holder shaft interface comprising: a holder shaft plane surface oriented transversely to a longitudinal axis, against which holder shaft plane surface a tool holder plane surface can come into abutment in order to be able to establish a defined relative position in longitudinal direction between the tool holder and the holder shaft, a holder shaft cone section, which is polygonal in a cross-section and which can come into engagement with a correspondingly polygonal tool holder cone section in order to be able to establish a defined relative position in tangential direction between the tool holder and the holder shaft, and a holder shaft cylinder section which can act together with a corresponding tool holder cylinder section.

Furthermore, the above object is solved by a tool assembly with a tool holder assembly comprising a tool holder of the type according to the invention with a tool secured thereto and a holder shaft of the type according to the invention.

Finally, the above object is solved by a method for manufacturing a tool holder of the type according to the invention, comprising the steps:
providing a tool holder blank;
forming the tool holder interface on the tool holder blank;
inserting the tool holder blank into a reference holder shaft such that the tool holder plane surface abuts a holder shaft plane surface of the reference holder shaft; and
machining a tool mount of the tool holder blank to finish the tool holder.

A quick-change function can be realized with the tool holder according to the invention and the holder shaft according to the invention. The holder shaft can remain clamped in a clamping device of a machine tool. A wide variety of tools on tool holders, each possessing an identical tool holder interface but different tool mounts, can be attached in this manner to a holder shaft clamped as such.

The interfaces of the tool holder and holder shaft are preferably coordinated with each other such that, in the mounted position, an abutment of the plane surfaces is always realized. Despite the fact that the holder components also come into contact with each other via their cone sections, this can lead to the result that a tool mount and a tool inserted therein assume a defined relative position in relation to the clamping of the holder shaft in the machine tool, which is at least already pre-calibrated.

The relative position between the tool holder and the holder shaft established in this way is preferably geometrically over-defined. This is because the cone sections of the tool holder and holder shaft are machined so precisely in relation to the respective plane surfaces that the cone sections, especially in a cross-sectional portion in which the cone sections are polygon-shaped, come into abutment to each other, and at the same time the plane surfaces come into abutment to each other. In this way it can be achieved that, in the attached position of the tool holder to the holder shaft, for one, a defined position of these components can be established in longitudinal direction (transverse to the plane surfaces) as well as in the tangential or circumferential direction respectively. With the defined position in tangential direction a defined position in directions transverse to the longitudinal direction is ultimately also realized. In other words, a reference position of the tool mount of the tool holder can assume a defined relative position to the holder shaft and consequently to the clamping device of the machine tool, wherein this relative position can be realized with an accuracy of preferably less than 0.01 mm.

It is thereby particularly advantageous if at least one of the plane surfaces of the tool holder and the holder shaft is only milled and not ground.

Furthermore, the tool holder assembly can be configured for relatively small machine tool systems, for example with diameters of the holder shaft in the range of 8 mm to 30 mm, in particular in a range of 10 mm to 25 mm.

Especially in such systems, where relatively little material is available for a safe fixation in longitudinal and tangential direction, the interface of the tool holder and the holder shaft according to the invention can provide excellent results.

In the case of the tool holder according to the invention, the tool can be, for example, a cutting plate, in particular an indexable plate. In particular, the tool can be detachably secured to the tool mount.

The cone section and the cylinder section of the tool holder or holder shaft respectively are each oriented parallel to the longitudinal axis, in particular concentric to it.

The cone section of the tool holder and holder shaft is preferably located, in the longitudinal direction, between the respective cylinder section and the respective plane surface.

The cylinder sections of the tool holder and holder shaft are machined as a fit. The fit is preferably a clearance fit, wherein the clearance fit is in particular configured such that the parts can just barely be slid by hand.

Due to the fit, it can therefore be achieved that the tool holder can also be fixated to the holder shaft in a fashion secured against tilting in relation to the longitudinal axis.

The fit between the cylinder sections of the tool holder and the holder shaft also enables an axial tightening device to be performed via a cone screw of the type of a grub screw or longitudinal clamping screw respectively without any canting occurring.

Due to the combination of the plane surface and the cone section a high level of fluid leakproofness in the fixated position between the tool holder and the holder shaft can be achieved, allowing fluid to be guided from the holder shaft to the tool holder without the need for a seal to be formed in the area of the cylinder sections or at any other point.

The interfaces of the tool holder and holder shaft are preferably each produced by a milling process. It is also preferred if the milling process is performed with accuracies in the range of 0-0.002 mm. It is also preferred if the surfaces of the interfaces are not machined further after milling, i.e. in particular if they are not ground, honed or the like.

In the case of the method according to the invention, the tool holder interface is first produced on a tool holder blank. The tool holder is then inserted into a reference holder shaft that is calibrated with respect to its holder shaft interface. After insertion, the tool mount is manufactured, also by a milling process for example. Due to this measure, the tool mount can be manufactured such that it comprises at least one reference point that is calibrated with respect to the tool holder interface.

This makes it possible to provide tool holders with tool mounts that are calibrated or pre-calibrated in relation to a holder shaft inserted in a machine tool, so that time-consuming calibration work or calibration activities can preferably be spared when changing tools.

It is possible to document and assign such a reference position in the form of a reference length or also in the form of a reference angle or the like for the tool holder manufactured in this way, so that when the tool holder is inserted into a holder shaft, which is clamped in a machine tool, calibration can be performed by entering this reference value or this reference point respectively, at least a kind of pre-calibration. Since a repeat accuracy of less than 0.01 mm is preferably achieved after a tool change, a workpiece with a larger tolerance can be manufactured without correction (final calibration).

The object is thus completely solved.

In the case of the tool holder according to the invention, it is of particular advantage if an axial tightening feature of an axial tightening device is formed on the tool holder cylinder section.

In this way, it is possible to tighten the tool holder and the holder shaft axially against each other by means of a suitable tightening tool until the plane surfaces come into abutment.

It is thereby advantageous if the axial tightening device comprises a radial recess in the tool holder, in particular in a tool holder cylinder section, the radial recess comprising a slanted surface oriented at an angle, on which a longitudinal clamping screw of the holder shaft can engage.

The slant angle of the slanted surface is preferably in a range of 20° to 70° relative to a plane oriented perpendicularly to the longitudinal axis.

The slanted surface can be a plane surface, but is preferably a cone surface that can engage a longitudinal clamping bolt with a corresponding cone section.

According to a further embodiment, the tool mount is arranged offset in a transverse direction with respect to the tool holder longitudinal axis, the axial tightening feature being arranged on a side of the tool holder longitudinal axis opposite the tool mount as viewed in the transverse direction.

Particularly in machine tools with several tool holder assemblies arranged in parallel, especially with a series of tool holder assemblies arranged transversely to a longitudinal axis of the workpiece, it can hereby be achieved that the fixation between the tool holder and the holder shaft can be released in an easy manner. This is because this configuration allows simplified accessibility.

Furthermore, it is advantageous if the tool holder cone section comprises a shape which is substantially polygonal at least in a cross-section adjacent to the tool holder plane surface, preferably polygonal over its entire length. An undercut can be provided at the transition to the tool holder cylinder section.

In this way, it can be achieved that the engagement of the cone sections can provide tangential securing, particularly when the interfaces abut with their plane surfaces.

Furthermore, it is advantageous if a tool holder bore for supplying a coolant or lubricant is formed in the tool holder body.

In this way, coolant or lubricant can be transferred from the holder shaft to the tool holder. Preferably, a channel of the tool holder, which is connected to this tool holder bore, opens so that the coolant or lubricant can be sprayed directly onto a machining section of the tool.

In the case of the holder shaft according to the invention, it is advantageous if the holder shaft cylinder section comprises a radial threaded bore into which a longitudinal clamping screw can be screwed, which can engage in a radial recess of the tool holder.

The threaded bore and the longitudinal clamping screw are, together with the radial recess, part of an axial tightening device. Access to the longitudinal clamping screw occurs preferably from one side of the longitudinal axis, which is opposite of a tool mount of the tool holder.

It is also advantageous if the holder shaft cylinder section comprises a radial clearance recess extending over an axial length which is smaller than an axial length of the holder shaft cylinder section.

Such a radial clearance recess can be sickle-shaped in cross-section, for example.

The radial clearance recess preferably comprises an axial length which is in a range of 30% to 90% of the axial length of the holder shaft cylinder section, in particular in a range of 50% to 90%.

On the one hand, the radial clearance recess allows a fit to be formed between the cylinder sections such that the parts can just barely be moved by hand. This fit is now effective particularly in that part of the holder shaft cylinder section within which the clearance recess is not provided.

The radial clearance recess is preferably arranged at a distance from an axial end of the holder shaft cylinder section.

In this way, the fit between the cylinder sections only comes into full engagement when only a short axial piece is left to be inserted.

The radial clearance recess extends in circumferential direction preferably over an angular range of less than 180°, in particular less than 150°.

It is of particular advantage if the radial clearance recess overlaps with the radial threaded bore in circumferential direction.

Due to this measure, it is possible to achieve that the tool holder and holder shaft can be tightened axially to each other, even in the area of the polygonal cone section, without canting occurring.

According to a further advantageous embodiment, the holder shaft body comprises a holder shaft bore for supplying a coolant or lubricant, which can be connected to a tool holder bore of a tool holder.

Coolant or lubricant can be fed into the holder shaft bore preferably via an axial end of the holder shaft body, or via a radial feed.

It is of particular advantage if the holder shaft bore opens into an end face of the holder shaft body opposite the holder shaft interface and comprises a sealing device, via which a feed tube introduced into the holder shaft bore can be sealed.

It goes without saying that the features mentioned above and those to be explained below can be used not only in the combination indicated in each case, but also in other combinations or on their own, without leaving the scope of the present invention.

BRIEF DESCRIPTION OF THE DRAWINGS

Embodiments of the invention are shown in the drawing and are explained in more detail in the following description.

FIG. 7 shows a schematic illustration of a further tool holder assembly with bores for coolant or lubricant;

FIG. 8 shows an illustration of one end of a holder shaft with a feed tube inserted into a holder shaft bore; and FIG. 9 shows an illustration of a lubricant distributor device with feed pipes for a plurality of tool holder assemblies.

DETAILED DESCRIPTION

Figure 1:
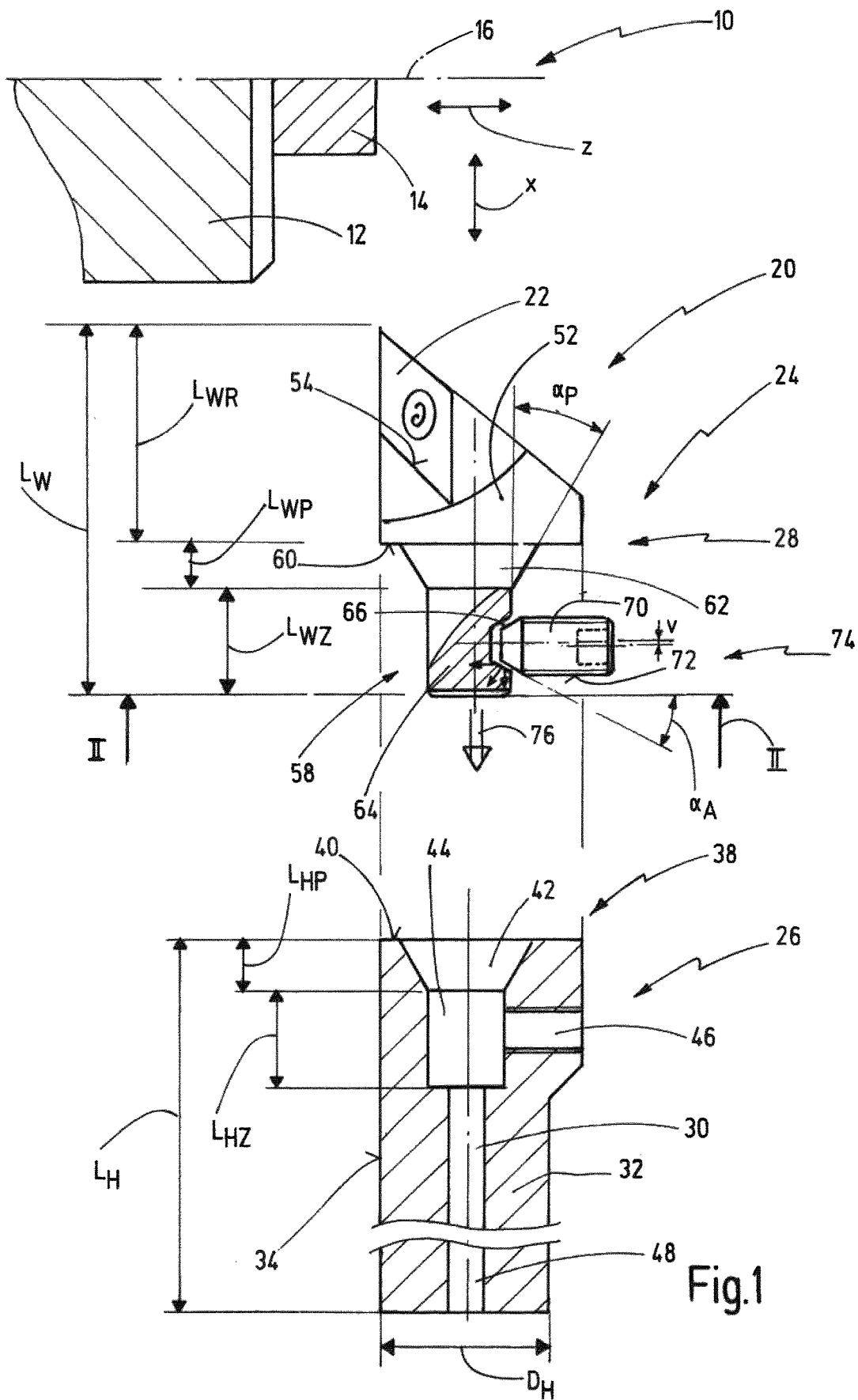
FIG. 1 shows a schematic illustration of a machine tool with a tool assembly according to the invention, which includes a tool holder assembly with a tool holder and a holder shaft.

In FIG. 1, a machine tool in the form of a lathe 10 is shown in schematic form, in association with a tool assembly which is denoted in general by 20 in FIG. 1.

The lathe 10 comprises a clamping device 12, indicated in schematic form, for a workpiece 14 to be machined via turning, wherein the clamping device 12 can be part of a spindle, not further specified, which is mounted to rotate about an axis of rotation 12.

The tool assembly 20 comprises a tool 22 and a cutting plate, in particular an indexable plate, wherein the tool 22 can be detachably secured to a tool holder assembly 24.

The tool holder assembly 24 comprises a holder shaft 26, which is configured as one part, and a tool holder 28, which is configured as a separate part and which can be connected and attached to the holder shaft 26 as shown below. The tool holder assembly 24 comprises a longitudinal axis 30. The longitudinal axis 30 is preferably oriented parallel to a coordinate axis x during a lathe process. The rotary axis 16 of the lathe 10 is preferably oriented parallel to a z-axis of this coordinate system. The relative movement between the workpiece 14 and tool 22 can be performed in the z-direction by moving the tool holder assembly 24 in the Z-direction and/or by moving the spindle or clamping device 12 respectively in the z-direction. The infeed movement in the x-direction, on the other hand, is preferably performed by the tool holder assembly 24, as is generally the case for lathes.

The y-coordinate not shown in FIG. 1 in more detail is preferably also adjustable by means of the tool holder assembly 24, but can also be configured by a spindle that can be moved in the y-direction.

The holder shaft 26 comprises a holder shaft body 32, which contains a shaft section 34. The shaft section 34 can be clamped in a tool holder mount of the machine tool. The shaft section 34 can be round in cross-section, but is preferably polygonal in cross-section, in particular square.

The shaft section 34 in cross section has a diameter $D_H$, which can be in the range of 5 mm to 30 mm, in particular in the range of 10 mm to 25 mm.

Furthermore, the holder shaft body 32 comprises an axial length $L_H$ which is greater than the diameter $D_H$.

At one axial end, the holder shaft body 32 comprises a holder shaft interface 38. The holder shaft interface 38 includes a plane surface 40 at one end face of the holder shaft body 32.

The holder shaft interface 38 also comprises a holder shaft cone section 42 that is part of an axial recess in the holder shaft body 32, wherein the holder shaft cone section 42 extends from the holder shaft plane surface 40 and extends into the holder shaft body 32 by an axial length $L_{HP}$. The holder shaft cone section 42 comprises adjacent to the holder shaft planar surface 40 a shape in cross section which is polygonal or polygon-shaped respectively.

The axial recess in the holder shaft body 32 also includes a holder shaft cylinder section 44 which extends from the holder shaft cone section 42 axially into the holder shaft body 32 by a length $L_{HZ}$. The length $L_{HZ}$ is preferably greater than $L_{HP}$.

The holder shaft cone section 42 is substantially circular in cross-section adjacent to the holder shaft cylinder section 44. The holder shaft cone section 42 is shaped so that it continuously changes from the circle shape adjacent to the holder shaft cylinder section 44 to the polygon shape which the holder shaft cone section 42 has adjacent to the plane surface 40.

In the area of the holder shaft cylinder section 44, the holder shaft body 32 has a radially oriented threaded bore 46 for receiving a longitudinal clamping screw. The radial threaded bore 46 extends from a radially outer side of the holder shaft body 32 into the holder shaft cylinder section 44.

The holder shaft body 32 also comprises an axial bore 48, which can be used to supply lubricating or cooling fluid, for example. The bore 46 extends from an axial end face of the holder shaft body 32 opposite the holder shaft interface 38 into a bottom of the axial recess, i.e. to one end of the holder shaft cylinder section 44.

The tool holder assembly 24 also comprises a tool holder 28. As shown in FIG. 1, the tool holder 28 comprises a tool holder body 52, at one axial end of which a tool mount 54 is formed, within which a tool 22, for example in the form of a cutting plate, can be detachably secured. An axial length of the tool holder 28 with the tool 22 fixated thereto is marked with $L_W$ in FIG. 1. The value of $L_W$ is preferably smaller than the axis of the length $L_H$ of the holder shaft 26.

The tool holder 28 also includes a tool holder interface 58, which is configured complementary to the holder shaft switching point 38.

The tool holder interface 58 includes a tool holder plane surface 60, which is oriented transversely, in particular perpendicularly to the longitudinal axis 30.

Furthermore, the tool holder interface 58 comprises a tool holder cone section 62 that extends from the plane surface 60. The tool holder cone section 62 extends in relation to the longitudinal axis 30 at an angle $\alpha_P$, which can lie in a range from 5° to 75°, in particular in a range from 5° to 50°, preferably in a range from 5° to 15°.

The tool holder cone section 62 has a polygonal shape at least in a cross-section adjacent to the plane surface 60. A tool holder cylinder section 64, which is also part of the tool holder interface 58, extends from the opposite axial end of the tool holder cone section 62.

The tool holder cone section 62 comprises an axial length $L_{WP}$. The tool holder cylinder section 64 comprises an axial length $L_{WZ}$. Preferably, the following applies: $L_{HP}=L_{WP}$ and/or $L_{WZ}=L_{HZ}-L_{WZ}$ can also be greater than $L_{WZ}$ however.

The tool holder body 52 comprises a radial recess 66 in the area of the tool holder cylinder section 64, which contains a slanted surface oriented at an angle $\alpha_A$. The slanted surface can be part of a cone shape of the radial recess 66. The angle $\alpha_A$ is established between the slanted surface and a plane, which runs perpendicularly to the longitudinal axis 30 and is preferably in a range of 20° to 70°.

FIG. 1 also shows, in schematic form, a longitudinal clamping screw 70, which comprises a cylindrical threaded section for screwing into the radial threaded bore 46 of the holder shaft 26, and a cone section extending from this cylindrical externally threaded section, the pitch of which is adapted to the angle $\alpha_A$. Radially oriented central axes of the recess 66 and the longitudinal clamping screw 70 are axially offset, as shown schematically for v.

To fixate the tool holder 28 to the holder shaft 26, the tool holder cylinder section 64 is inserted into the axial recess of the holder shaft 26. The cylinder sections 44, 64 are machined to a fit so that they can just barely be slid against each other by hand. The cone sections 42, 62 are preferably configured as self-centering. As soon as they end up in each other, the longitudinal clamping screw 70 is activated by means of a tightening tool. This causes the cone section of the longitudinal clamping screw 70 to engage the slanted surface of the radial recess 66, so that an axial tightening force 76 is generated by the offset v, by means of which axial tightening force 76 the tool holder 28 is pulled axially towards the holder shaft 26 until the plane surfaces 40, 60 abut each other. In this state, the polygonal cross-sections of the tool holder cone section 62 and holder shaft cone section 42 are also in abutment such that precise fixing between the tool holder 28 and the holder shaft 26 in the tangential direction, i.e. in the direction of rotation or circumferential direction, is also achieved.

The simultaneous abutment in the area of the cone sections 42, 62 and the plane surfaces 60, 40 results from a geometrical over-definition, which is achievable due to the very precise machining of these surfaces by a milling process.

At least the plane surfaces 40, 60 are not ground. Preferably the cone sections 42, 62 are not ground either. In many cases the cylinder sections 44, 64 can also not be ground.

Preferably, both the tool holder shaft interface 38 and the tool holder interface 58 are only milled, but not ground.

The radial threaded bore 46, the longitudinal clamping screw 70 and the radial recess 66 together form an axial tightening device 74.

Figure 2:
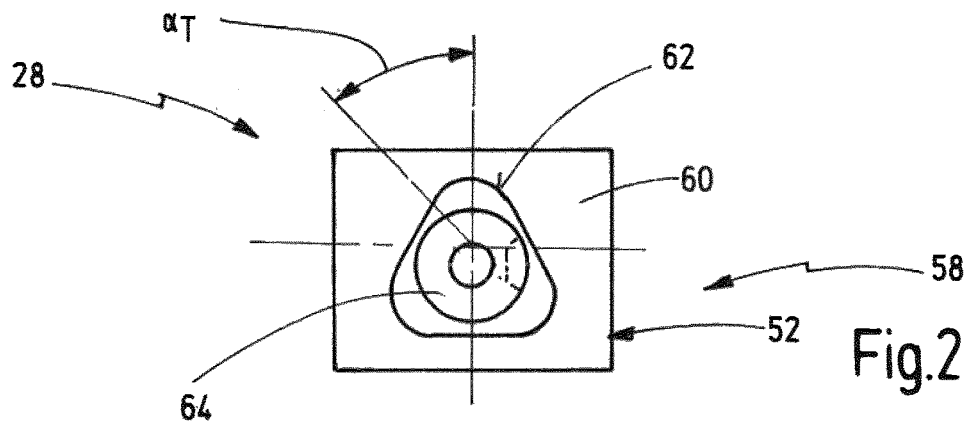
FIG. 2 shows a sectional view along line II-II of FIG. 1.

FIG. 2 shows a top view of the tool holder interface 58 and shows that the circular shape of the tool holder cylinder section 64 continuously changes into the polygonal shape of the tool holder cone section 62, which it has in a cross section adjacent to the plane surface 60. The tool holder cone section 62 is essentially triangular in shape with fillets in the area of the triangle tips.

FIGS. 1 and 2 show that when the plane surfaces 40, 60 are in abutment, an exact position between a cutting edge of the tool 22 and the plane surface 60 can result. Furthermore, FIG. 2 shows that the polygon shape allows a relative position in the circumferential direction to be established between the tool holder 28 and a holder shaft fixated to it, which is indicated schematically in FIG. 2 by an angle $\alpha_T$.

The tool holder 28 is preferably manufactured in the following way. First, the tool holder interface 58 is formed on a tool holder blank, preferably by a milling process.

Subsequently, the tool holder blank formed as such is then inserted into a reference holder shaft such that the tool holder plane surface abuts against the plane surface of the reference holder shaft. An axial tightening device 74 is preferably used for this purpose, as shown in FIGS. 1 and 2.

The reference holder shaft has a holder shaft plane surface which is calibrated in relation to other characteristics of the holder shaft, in particular with regard to its position in the x-direction. Furthermore, the plane surface of the holder shaft can be calibrated more precisely by grinding or the like than the plane surfaces of normal holder shafts which are not configured as reference holder shafts.

After fixating the tool holder blank to the reference holder shaft, a tool mount 54 of the tool holder blank is machined or finished respectively. This enables the tool holder mount to be machined exactly with respect to the plane surface 60. A reference dimension, such as the dimension $L_{WR}$ in FIG. 1, can be stored as a reference length that is assigned to the particular tool holder 28. This reference length can, for example, be entered into a control of a machine tool if this tool holder is used. This allows a calibration or at least a pre-calibration to be performed.

Due to the way the tool holder is manufactured, the angle $\alpha_T$ shown in FIG. 2 can of course be exactly known with regard to the tool mount. Also the angle $\alpha_T$ (or another similar angle) can be assigned to the tool holder manufactured in this way and can be made known to a control system of a machine tool, for example, if this tool holder is used.

Figure 3:
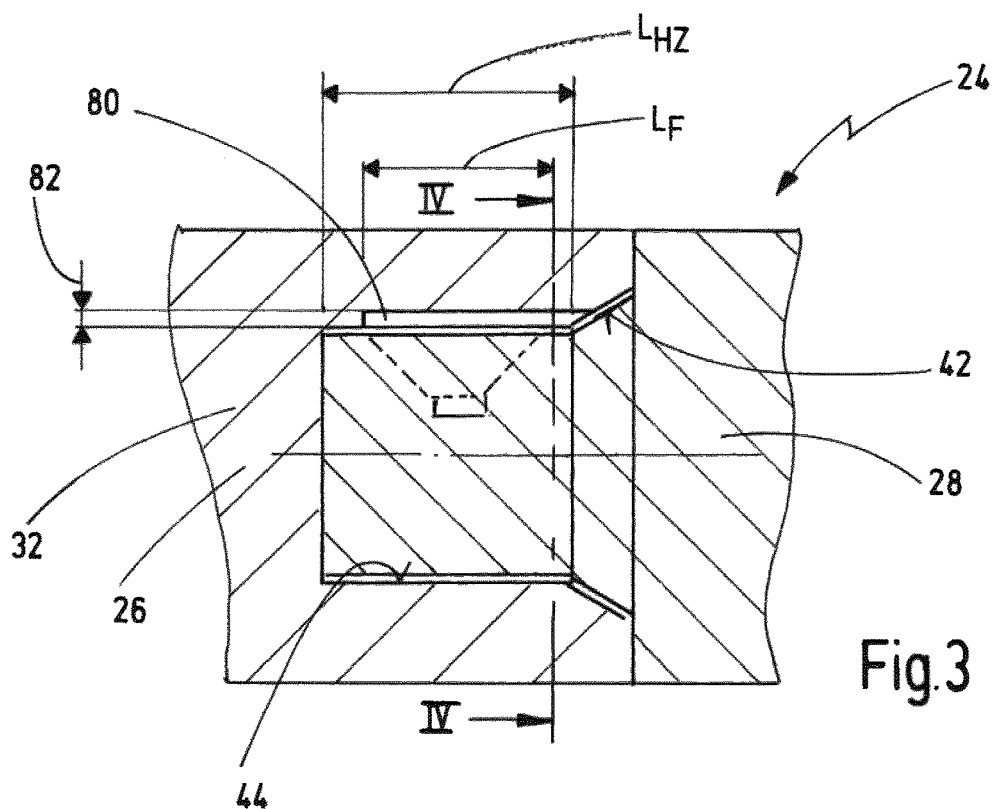
FIG. 3 shows a schematic longitudinal sectional view through another embodiment of a tool holder assembly.

FIG. 3 shows an alternative embodiment of a tool holder assembly 24, which generally corresponds to the tool holder assembly 24 of FIGS. 1 and 2 with regard to the setup and function. Identical elements are therefore marked by identical reference marks. The differences are essentially explained in the following.

Figure 4:
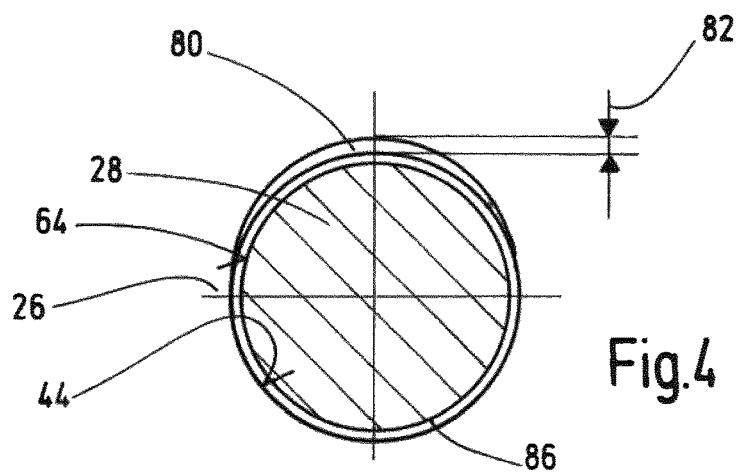
FIG. 4 shows a schematic sectional view along line IV-IV of FIG. 3.

FIG. 3 shows that the holder shaft 26 has a radial clearance recess 80 in the area of the holder shaft cylinder section 64, the sickle shape of which can be seen in FIG. 4.

The clearance recess 80 preferably extends over an angular range of less than 180°, in particular less than 150°, and has a radial depth 82, preferably in a range greater than 0.1 mm and less than 2 mm.

The clearance recess 80 is distanced in axial direction from the bottom of the axial recess in the holder shaft body 32, but preferably extends axially to the holder shaft cone section 42. The axial length $L_F$ of the clearance recess 80 is therefore preferably less than the axial length $L_{HZ}$ of the holder shaft cylinder section 44. The cylinder sections 44, 64 of the holder shaft 26 and tool holder 29 are machined to a fit as shown schematically at 86 in FIG. 4. The fit is preferably a clearance fit, namely a tight clearance fit, so that tool holder 28 and holder shaft 26 can just barely be moved against each other by hand.

Figure 5:
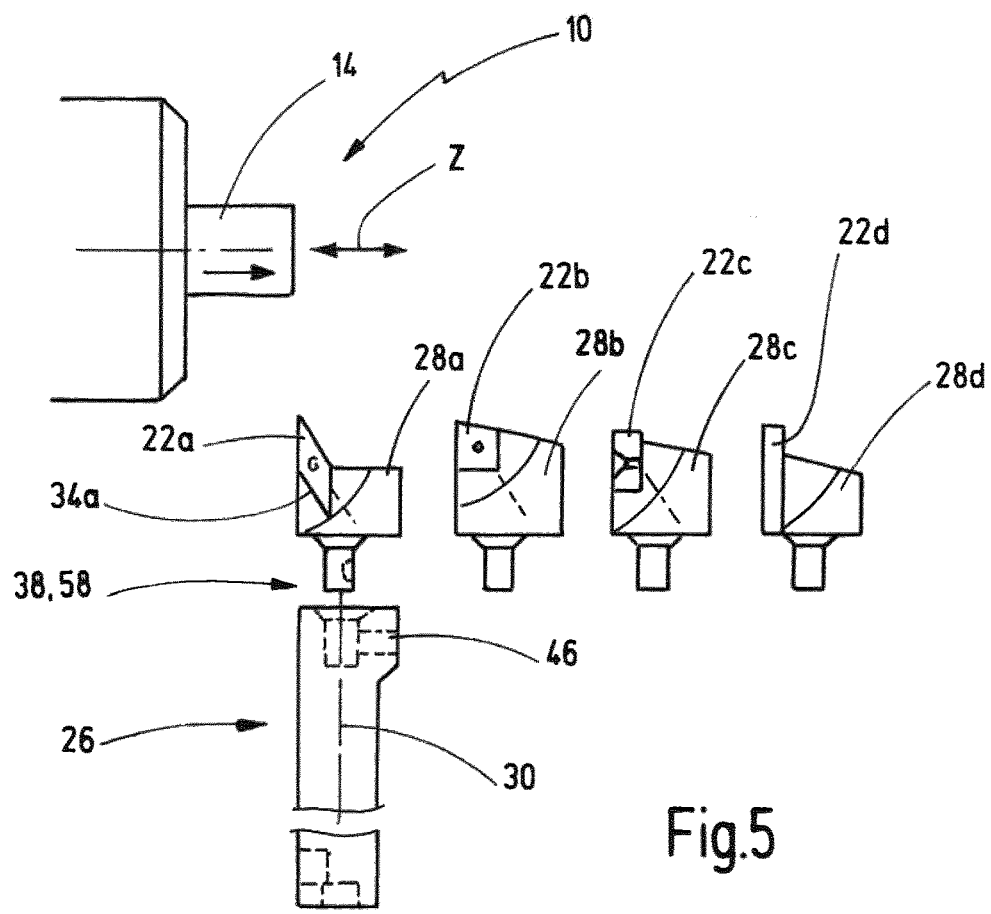
FIG. 5 shows a schematic illustration of a holder shaft with different tool holders.

FIG. 5 shows a further embodiment of a machine tool 10 with a holder shaft 26 and a plurality of different tool holders 28a, 28b, 28c, 28d, each carrying different tools 22a, 22b, 22c, 22d.

The tools can be configured for different types of lathe operations, for example, for face turning, for cylindrical turning, for thread turning, for profile turning, for contour turning, etc.

In all cases, the respective tool holders 28a-28d comprise an identical tool holder interface 58, so that the tools 28a-28d can each be inserted into and fastened to one and the same holder shaft 26.

FIG. 5 also shows that the tools 22a are each arranged in a direction transverse to the longitudinal axis 30 offset from the longitudinal axis 30, in any case with regard to their machining edge coming into engagement.

In this orientation, the radial threaded bore 46 of the holder shaft 26 is generally arranged on a radially opposite side of the longitudinal axis 30, i.e. in the illustration in FIG. 5 on a side facing away from the workpiece. In other words, the tool mount 54 and the axial tightening device 74 are arranged in z-direction (see above definition) on different sides of the longitudinal axis 30 of the tool holder assembly 24.

This results in good accessibility, so that the tool holders 28 are easily exchangeable.

Figure 6:
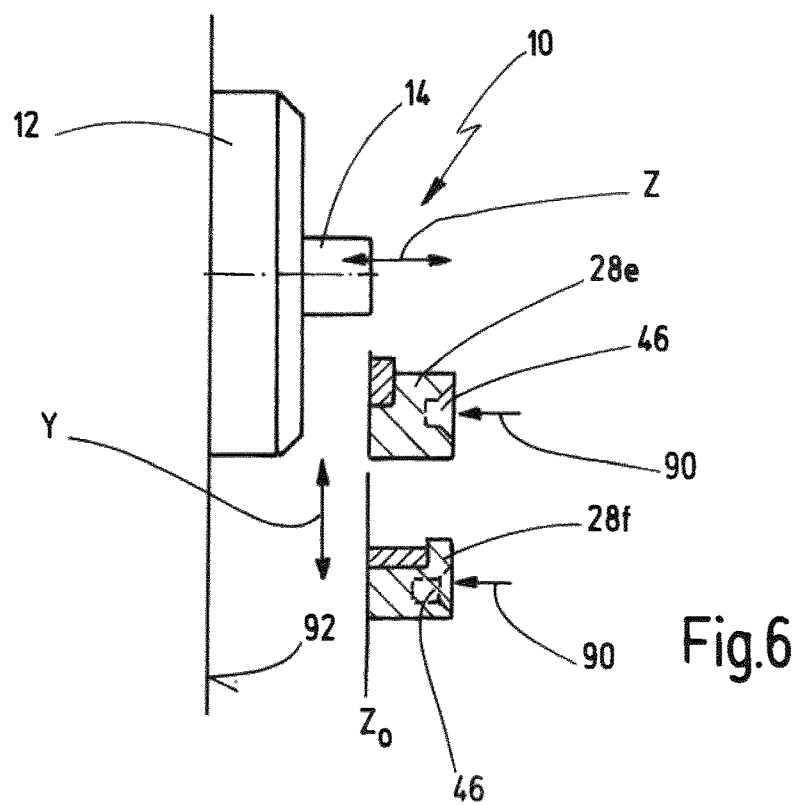
FIG. 6 shows an illustration of a machine tool with a clamping device for a workpiece and a plurality of tool holder assemblies oriented in a y-direction.

FIG. 6 shows a situation in which a plurality of tool holders 28e, 28f, . . . are arranged parallel offset to each other in the direction of the y-axis. The tool holders 28e, 28f can also comprise different tools, as shown in FIG. 6, but not described in detail.

In FIG. 6 a spindle box 92 is also shown. The access to the respective radial threaded bores 46 of the respective holder shafts 26 occurs on a side facing away from the spindle box 92 (as viewed in z-direction), so that for all these tool holder assemblies a good accessibility is given as shown in FIG. 6 at 90.

FIG. 7 shows a further embodiment of a tool holder assembly 24, wherein it is shown that on the one hand the tool holder 28 has a tool holder bore 96 for guiding cooling or lubricating fluid, wherein the tool holder bore 96 can emerge from the tool holder body 52 at a point so that the cooling or lubricating fluid can be directed onto the tool 22, preferably onto its machining edge.

Furthermore, FIG. 7 shows that a holder shaft bore 48 provided in the holder shaft 26 can, for one, be brought into connection with the tool holder bore 96 to transfer cooling or lubricating fluid from the holder shaft 26 to the tool holder 28. Due to the high tightening forces between the interfaces of the tool holder 28 and the holder shaft 26, a seal can be dispensed with.

The holder shaft bore 48 can comprise an axial connection 98, or a radial connection 100, wherein these connections 98, 100 are provided in the area of an axial end of the holder shaft 26, which is located axially opposite of the holder shaft interface 38.

FIG. 8 shows a holder shaft 26 in which the holder shaft bore 48 comprises an axial connection 98. Furthermore, a sealing ring 106 is provided in the interior of the holder shaft bore 48, so that a feed pipe 104 inserted into the holder shaft bore 48 can be sealed. Alternatively (FIG. 8a), an adapter 108 with a sealing ring 106 can be provided.

As shown in FIG. 9, a plurality of such feed pipes 104a, 104b can be arranged on a lubricant distributor device 110. The lubricant distributor device 110 comprises a distributor channel 112 extending for example in y-direction, which is provided with a plurality of taps through which lubricating or cooling fluid guided therein can be introduced into the respective feed pipes 104a, 104b. The distributor channel 112 is connected to a feed connection 114 through which cooling or lubricating fluid 116 can be introduced. Unused taps of the distributor channel 112 can be closed with a plug 118.

The invention claimed is:

1. A tool holder for holding a tool for machining workpieces, the tool holder comprising:
    a tool holder body defining a tool holder longitudinal axis;
    a tool mount formed on the tool holder body and configured to secure a tool; and
    a tool holder interface formed on the tool holder body and configured to fixate the tool holder to a holder shaft configured to be clamped in a machine tool, wherein the tool holder interface comprises:
        a tool holder plane surface oriented transversely to the tool holder longitudinal axis and configured to come into abutment against a holder shaft plane surface provided at the holder shaft to establish a defined relative position in a longitudinal direction between the tool mount and the holder shaft,
        a tool holder cone section having a polygonal cross-section and configured to come into engagement with a correspondingly polygonal holder shaft cone section in order to establish a defined relative position in a tangential direction between the tool mount and the holder shaft, and
        a tool holder cylinder section configured to act together with a corresponding holder shaft cylinder section, wherein the tool holder cylinder section comprises only one radial recess comprising a slanted surface oriented at an angle and configured to interact with a longitudinal clamping screw of the holder shaft to axially tighten the tool holder cylinder section with the holder shaft cylinder section.

2. The tool holder of claim 1, wherein the tool mount is arranged offset in a transverse direction with respect to the tool holder longitudinal axis, the radial recess being arranged on a side of the tool holder longitudinal axis opposite the tool mount as viewed in the transverse direction.

3. The tool holder of claim 1, wherein the tool holder cone section has a substantially polygonal shape at least in a cross-section adjacent to the tool holder plane surface.

4. The tool holder of claim 1, wherein a tool holder bore for supplying a coolant or lubricant is formed in the tool holder body.

5. A tool assembly comprising:
    the tool holder of claim 1;
    the tool secured to the tool holder; and
    the holder shaft.

6. A method for manufacturing a tool holder for holding a tool for machining workpieces, the method comprising:
    providing a tool holder blank;
    forming a tool holder interface on the tool holder blank, wherein the tool holder interface is configured to fixate the tool holder to a holder shaft configured to be clamped in a machine tool, wherein the tool holder interface comprises:
        a tool holder plane surface oriented transversely to a tool holder longitudinal axis and configured to come into abutment against a holder shaft plane surface provided at the holder shaft to establish a defined relative position in a longitudinal direction between a tool mount of the tool holder blank and the holder shaft,
        a tool holder cone section having a polygonal cross-section and configured to come into engagement with a correspondingly polygonal holder shaft cone section in order to establish a defined relative position in a tangential direction between the tool mount and the holder shaft, and
        a tool holder cylinder section configured to act together with a corresponding holder shaft cylinder section, wherein the tool holder cylinder section comprises a radial recess comprising a slanted surface oriented at an angle and configured to interact with a longitudinal clamping screw of the holder shaft to axially tighten the tool holder cylinder section with the holder shaft cylinder section;
    inserting the tool holder blank into a reference holder shaft such that the tool holder plane surface abuts a holder shaft plane surface of the reference holder shaft; and
    machining the tool mount to finish the tool holder, wherein the tool mount is configured to secure the tool.

7. The method of claim 6, further comprising storing for the finished tool holder a reference length representing a dimension between the tool holder plane surface and a reference point of the tool mount.

8. A holder shaft for a tool holder, the holder shaft comprising:
    a holder shaft body comprising a shaft section configured to be clamped in a clamping device of a machine tool, and further comprising a holder shaft interface for fastening a tool holder to the holder shaft body, wherein the holder shaft interface comprises:
        a holder shaft plane surface oriented transversely to a tool holder longitudinal axis and configured to come into abutment against a tool holder plane surface provided at the tool holder in order to establish a defined relative position in a longitudinal direction between the tool holder and the holder shaft;

a holder shaft cone section having a polygonal cross-section and configured to come into engagement with a correspondingly polygonal tool holder cone section in order to establish a defined relative position in tangential direction between the tool holder and the holder shaft; and a holder shaft cylinder section configured to act together with a corresponding tool holder cylinder section, wherein the holder shaft cylinder section comprises:

a radial threaded bore configured to receive a longitudinal clamping screw to engage in a radial recess of the tool holder to axially tighten the tool holder cylinder section with the holder shaft cylinder section, and a radial clearance recess that:
extends over an axial length which is smaller than an axial length of the holder shaft cylinder section,
extends over an angular range of less than 360°, and
overlaps with the radial threaded bore in a circumferential direction.

9. The holder shaft of claim 8, wherein the radial clearance recess extends over an angular range of less than 180°.

10. The holder shaft of claim 9, wherein the radial clearance recess extends over an angular range of less than 150°.

11. The holder shaft of claim 8, wherein the holder shaft body comprises a holder shaft bore for supplying a coolant or lubricant, wherein the holder shaft bore is configured to be connected to a tool holder bore of the tool holder.

12. The holder shaft of claim 11, wherein the holder shaft bore opens into an end face of the holder shaft body opposite the holder shaft interface and comprises a sealing device configured to seal a feed tube introduced into the holder shaft bore.

13. A tool assembly comprising:
the holder shaft of claim 8;
the tool holder; and
a tool secured to the tool holder.

14. A holder shaft for a tool holder, the holder shaft comprising:

a holder shaft body comprising a shaft section configured to be clamped in a clamping device of a machine tool, and further comprising a holder shaft interface for fastening a tool holder to the holder shaft body, wherein the holder shaft interface comprises:

a holder shaft plane surface oriented transversely to a tool holder longitudinal axis and configured to come into abutment against a tool holder plane surface provided at the tool holder in order to establish a defined relative position in a longitudinal direction between the tool holder and the holder shaft;

a holder shaft cone section having a polygonal cross-section and configured to come into engagement with a correspondingly polygonal tool holder cone section in order to establish a defined relative position in tangential direction between the tool holder and the holder shaft; and a holder shaft cylinder section configured to act together with a corresponding tool holder cylinder section, wherein the holder shaft cylinder section comprises:

a radial threaded bore configured to receive a longitudinal clamping screw to engage in a radial recess of the tool holder to axially tighten the tool holder cylinder section with the holder shaft cylinder section, and a radial clearance recess that has, in a cross-section perpendicular to the holder shaft plane, the shape of a sickle.

15. The holder shaft of claim 14, wherein the radial clearance recess extends over an angular range of less than 180°.

16. The holder shaft of claim 15, wherein the radial clearance recess extends over an angular range of less than 150°.

* * * * *